United States Patent
Ekra Devalere et al.

(10) Patent No.: US 10,914,188 B2
(45) Date of Patent: Feb. 9, 2021

(54) DEVICE AND METHOD FOR COOLING A LOW PRESSURE TURBINE IN A TURBOMACHINE

(71) Applicant: Safran Aircraft Engines, Paris (FR)

(72) Inventors: Yolande Chantal Ohouan Ekra Devalere, Moissy-Cramayel (FR); Daniel Bernava, Moissy-Cramayel (FR); Michael Alain Eric Sauve, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/756,021

(22) PCT Filed: Oct. 15, 2018

(86) PCT No.: PCT/FR2018/052559
§ 371 (c)(1),
(2) Date: Apr. 14, 2020

(87) PCT Pub. No.: WO2019/077251
PCT Pub. Date: Apr. 25, 2019

(65) Prior Publication Data
US 2020/0308977 A1    Oct. 1, 2020

(30) Foreign Application Priority Data
Oct. 16, 2017  (FR) ...................... 17 59692

(51) Int. Cl.
| F01D 11/24 | (2006.01) |
| F02C 6/08 | (2006.01) |
| F02C 7/18 | (2006.01) |

(52) U.S. Cl.
CPC ............... *F01D 11/24* (2013.01); *F02C 6/08* (2013.01); *F02C 7/18* (2013.01);
(Continued)

(58) Field of Classification Search
CPC ...... F02C 6/08; F02C 7/16; F02C 7/18; F02C 7/185; F02C 9/18; F01D 11/24
See application file for complete search history.

(56) References Cited

U.S. PATENT DOCUMENTS

| 5,305,616 A | * | 4/1994 | Coffinberry | ............... F02C 7/12 60/784 |
| 8,726,672 B2 | * | 5/2014 | Ciofini | .................... F01D 9/065 60/782 |

(Continued)

FOREIGN PATENT DOCUMENTS

| EP | 0637683 A1 | 2/1995 |
| EP | 2305982 A1 | 4/2011 |

OTHER PUBLICATIONS

International Search Report and Written Opinion in corresponding International Application No. PCT/FR2018/052559, dated Jan. 16, 2019 (8 pages).

*Primary Examiner* — Craig Kim
(74) *Attorney, Agent, or Firm* — Bookoff McAndrews, PLLC

(57) ABSTRACT

An aircraft turbomachine (100) comprising a first channel (200) putting into communication the high-pressure compressor (30) and a high-pressure turbine (50), a second channel (400) putting into communication the high-pressure compressor and a low-pressure turbine (60), the first channel being equipped with a valve (600), a third channel (700) being in selective communication with the first channel via the valve, the third channel being in communication with the low-pressure turbine, the valve having a first configuration in which air circulation in the first channel is allowed and prohibited in the third channel, and a second configuration in which air circulation of the first channel is diverted to the third channel, a control device (800) being configured to determine an air pressure of the low-pressure turbine and (Continued)

command the valve to cause it to transition from the first configuration to the second configuration depending on the determined pressure.

12 Claims, 2 Drawing Sheets

(52) U.S. Cl.
CPC .. *F05D 2260/201* (2013.01); *F05D 2270/112* (2013.01); *F05D 2270/301* (2013.01); *F05D 2270/303* (2013.01)

(56) References Cited

U.S. PATENT DOCUMENTS

| | | | | |
|---|---|---|---|---|
| 9,797,259 | B2* | 10/2017 | Marsh | F01D 5/22 |
| 2003/0046938 | A1* | 3/2003 | Mortzheim | F02C 7/12 |
| | | | | 60/782 |
| 2006/0005546 | A1* | 1/2006 | Orlando | F02C 6/08 |
| | | | | 60/782 |
| 2009/0104020 | A1* | 4/2009 | Roush | F01D 25/12 |
| | | | | 415/145 |
| 2013/0177406 | A1* | 7/2013 | Heaton | F01D 25/183 |
| | | | | 415/176 |
| 2013/0192251 | A1* | 8/2013 | Munsell | F01D 11/04 |
| | | | | 60/782 |
| 2014/0271113 | A1* | 9/2014 | Khalid | F04D 27/0246 |
| | | | | 415/1 |
| 2015/0275769 | A1* | 10/2015 | Foutch | F02C 9/18 |
| | | | | 60/776 |
| 2018/0128178 | A1* | 5/2018 | Snape | F02C 7/18 |

* cited by examiner

DEVICE AND METHOD FOR COOLING A LOW PRESSURE TURBINE IN A TURBOMACHINE

CROSS-REFERENCE TO RELATED APPLICATION(S)

This patent application is the U.S. National Phase Entry under 35 U.S.C. § 371 of International Application No. PCT/FR2018/052559, filed on Oct. 15, 2018, which claims priority to French Patent Application No. 1759692, filed on Oct. 16, 2017.

BACKGROUND OF THE INVENTION

The invention relates to the field of turbomachines. More precisely, the invention relates to cooling a low-pressure turbine in an aircraft turbomachine.

It is usual, in a turbomachine, to collect air in a high-pressure compressor to cool parts in stages having a hotter environment. The cooling air collected in the high-pressure compressor is for example conveyed to the high-pressure and low-pressure turbines of the turbomachine. The conveyed air then allows purging the hot air and ventilating the attached parts (examples: disks, movable blades) of these turbines. Cooling of this type thus allows hedging against any risk of overheating of the movable parts of the turbines, which can lead, in the worst case, to a breakage of these parts.

In order to guarantee the compliance of cooling devices with aeronautical standards, it is moreover usual to over-dimension these devices.

By way of an example, even if three air circulation channels collecting air at the high-pressure compressor appear to be sufficient for cooling the low-pressure turbine, a fourth air circulation channel to the turbine will routinely be implemented. The creation of this additional channel allows guaranteeing that the flow or air collected at the high-pressure compressor remains sufficient in the event of breakage of a channel. Over-dimensioning of this type thus allows ensuring that any failure of an air circulation channel has no effect and does not affect the flight safety of the aircraft.

Although it is reliable, over-dimensioning of this type leads to collecting more air than is truly necessary from the high-pressure compressor in a nominal operating situation of the turbomachine, for example in the absence of a failure of an air circulation channel. Excess air collection of this type impacts the specific fuel consumption (SFC) of the aircraft in a non-negligible way.

It is therefore desirable to improve the performance of turbomachines, particularly to limit the impact of cooling systems on the fuel consumption of the aircraft.

PURPOSE AND SUMMARY OF THE INVENTION

The present invention has as its goal to correct the aforementioned disadvantages and to dispense, in particular, with over-dimensioning cooling systems.

To this end, the invention proposes an aircraft turbomachine comprising at least:
one high-pressure compressor,
one high-pressure turbine,
one low-pressure turbine,
one first cooling air circulation channel putting into communication the high-pressure compressor and the high-pressure turbine,
one second air cooling air circulation channel putting into communication the high-pressure compressor and the low-pressure turbine,
the first channel being equipped with a valve, the turbomachine also including a third cooling air circulation channel in selective communication with the first channel by means of the valve, the third channel also being in communication with the low-pressure turbine, the valve having a first configuration in which air circulation in the first channel is allowed and air circulation in the third channel is prohibited, and a second configuration in which air circulation originating in the first channel is diverted to the third channel.

Advantageously, it thus becomes possible to dispense with any over-dimensioning for cooling the low-pressure turbine. While a low-pressure turbine cooling device customarily necessitates additional air circulation channel to guarantee proper cooling of the turbine, a minimum number of channels for cooling the low-pressure turbine is used here. In other words, the low-pressure turbine is cooled just as needed by the second channel. During nominal operation of the turbomachine, the air collected from the high-pressure compressor can both be conveyed to the low-pressure turbine by the second channel for the purpose of cooling it just as needed and, by way of an example, to a turbomachine performance optimization device by the first channel. The specific fuel consumption of the turbomachine is therefore optimized under nominal operating conditions, these conditions corresponding to the first configuration of the valve.

If a failure occurs in the turbomachine, for example breakage of the second duct, the cooling air initially dedicated to the turbomachine performance optimization device is diverted to the low-pressure turbine so as to guarantee its proper cooling. Thus performance of the turbomachine in nominal operation, i.e. in the absence of failure, are optimized, particularly in terms of specific fuel consumption.

In one exemplary embodiment, the turbomachine comprises a control device configured to determine a cooling air pressure of the low-pressure turbine and command the valve depending on the determined air pressure to cause it to transition from the first configuration to the second configuration.

In exemplary embodiment, one end of the second channel and one end of the third channel are connected to a cooling air collector, the cooling air collector also being connected to a hollow nozzle of the low-pressure turbine.

In one exemplary embodiment, the turbomachine comprises a plurality of second cooling air circulation channels, each putting into communication the high-pressure compressor and the low-pressure turbine.

In one exemplary embodiment, the control device is configured to determine the cooling air pressure of the low-pressure turbine based on at least one measurement of a pressure sensor associated with the cooling air collector.

In another exemplary embodiment, the control device is configured to determine the value of the cooling air pressure of the low-pressure turbine based on at least one measurement of a pressure sensor positioned in an enclosure of the low-pressure turbine.

In another exemplary embodiment, the control device is configured to determine the cooling air pressure of the low-pressure turbine based on a difference of pressure measurements of pressure sensors associated with the plurality of second channels.

In one exemplary embodiment, the turbomachine also comprises a device for controlling clearance between blade tips of a rotor of the high-pressure turbine and a turbine annulus of a casing surrounding the blades of the high-pressure turbine, one end of the first cooling air circulation channel being in communication with the clearance control device of the high-pressure turbine so as to supply it with air when the valve is in the first configuration.

In one exemplary embodiment, the clearance control device of the high-pressure turbine is an internal device in the turbine annulus.

The invention also proposes, according to another aspect, a method for cooling a low-pressure turbine in an aircraft turbomachine produced as summarized above, this method comprising:
- collecting air circulating in the high-pressure compressor,
- in an initial situation corresponding to the first configuration of the valve, distributing the air collected to the high-pressure turbine by means of the first channel and to the low-pressure turbine by means of the second channel,
- determining a cooling air pressure of the low-pressure turbine and comparing the value of the determined pressure to a threshold by the control device, and
- when the cooling air pressure of the low-pressure turbine is lower than the threshold, commanding the valve into the second configuration by the control device, so as to distribute the cooling air of the first channel to the low-pressure turbine.

In one exemplary embodiment of this method, the threshold is predetermined based on a failure condition of the second channel.

BRIEF DESCRIPTION OF THE DRAWINGS

Other characteristics and advantages of the invention will be revealed by the following description of particular embodiments of the invention, given by way of non-limiting examples, with reference to the appended drawings, in which.

DETAILED DESCRIPTION OF EMBODIMENTS

Figure 1:
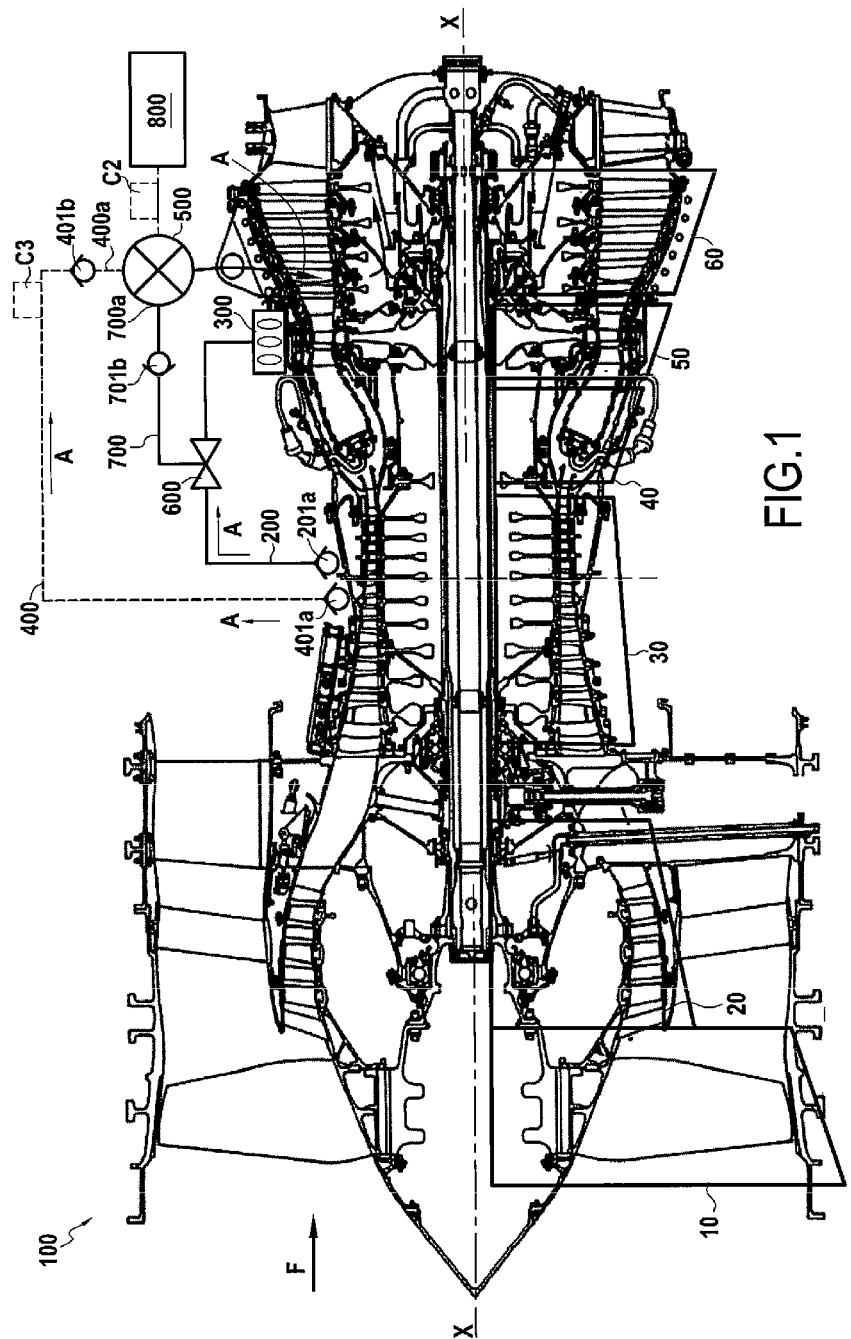
FIG. 1 is a longitudinal section view of a turbomachine equipped with a cooling device according to the invention.
Figure 2:
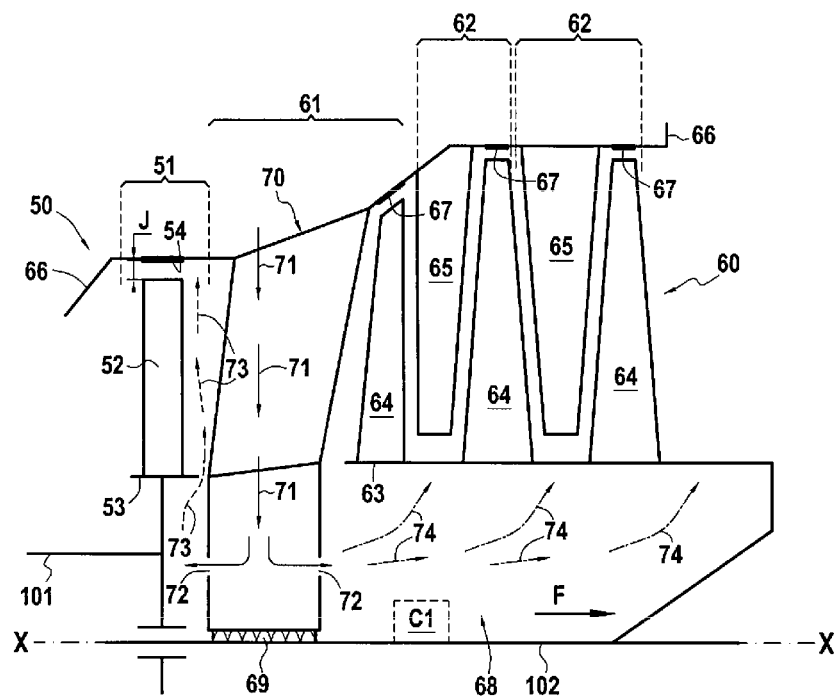
FIG. 2 is a partial longitudinal section view of a low-pressure turbine in a turbomachine according to the invention.

The terms "upstream" and "downstream" are hereafter defined relative to the gas flow direction through a turbomachine, indicated by the arrow F in FIGS. 1 and 2.

FIG. 1 illustrates a double flow turbomachine 100 comprising continuously from upstream to downstream successively at least one fan 10, one engine portion comprising successively at least one low-pressure compressor stage 20, one high-pressure compressor stage 30, one combustion chamber 40, at least one high-pressure turbine stage 50 and one low-pressure turbine stage 60.

Rotors, rotating around the main axis X of the turbomachine 100 and being able to be coupled together by different transmission and gear systems, correspond to these different elements.

In known fashion, air A is collected from the high-pressure compressor 30 for the purpose of cooling hotter zones of the turbomachine 100, particularly the high-pressure 50 and low-pressure 60 turbines.

FIG. 2 is an enlargement of a zone of the turbine engine 100, illustrating in a simplified manner the downstream portion of the high-pressure turbine 50 and upstream portion of the low-pressure turbine 60.

The downstream portion of the high-pressure turbine 50, shown here, illustrates a stage 51 comprising at least one movable blade 52 assembled to a movable disk 53 fixed in rotation to a high-pressure shaft 101.

The low-pressure turbine 60 illustrated here comprises a plurality of turbine stages 61, 62. A first stage 61, as well as stages 62 positioned downstream of it, comprise respectively a set of fixed nozzles 70 and 65. Each stage 61, 62 also comprises a movable disk 63 on which is mounted a set of blades 64 driven in rotation by the movable disk 63. The first stage 61 of the low-pressure turbine 60 comprises at least one movable blade 64, as well as at least one hollow nozzle 70, in which cooling air circulates. In the example illustrated in FIG. 2, the nozzle 70 forms a single part with the casing 66 constitutive of this turbine and is hollow to allow cooling air to pass in its interior, leaving by means of injectors 72 associated with the nozzle 70. The following stages 62, positioned downstream of the low-pressure turbine 60, each comprise at least one movable blade 64 and a nozzle 65 appearing in the form of fixed blading. The disk 63 is fixed in rotation with a low-pressure shaft 102 extending along the axis X-X, while each stator 65 is connected to the casing 66. Each stage 61, 62 of the turbine also comprises a turbine annulus 67 positioned facing the movable blades 64, and which is integral with the casing 66. Likewise, the high-pressure turbine 50 stage 51 comprises a casing, here the casing 66, which surrounds the movable blades 52 (rotors) of the high-pressure turbine 50 and comprises an (abradable) turbine annulus 54 positioned facing the blades 52.

The blades 52, 64, the stators 65 and the turbine annuli 54, 67 are made of CMC material. The casing 66 and the nozzle 70 are, for their part, made of a material having a thermal dilation coefficient strictly greater than that of the CMC material, for example a metallic material. The movable disks 53, 63 are made of a metallic material.

In conformity with the invention, the low-pressure turbine 60 comprises a cooling device allowing the air A collected from the high-pressure compressor 30 to be conveyed. This air A is conveyed through the hollow nozzle 70 and is distributed via the injectors 72 into the low-pressure turbine 60. In the example illustrated, the injectors 72 lead downstream of the high-pressure turbine 50 stage 51 and upstream of the first stage 61 of the low-pressure turbine 60. The air A therefore circulates (arrows 71) through the hollow nozzle 70 and is directed via the injectors 72 to the disks 53, 63 of the high-pressure 50 and low-pressure 60 turbines. The distributed air thus allows cooling the disks 53, 63 of these turbines and purging the hot air to the outside of the casing 66 (arrows 73, 74), thus limiting any risk of overheating rotors of the high-pressure 50 and low-pressure 60 turbines.

The air A collected at the high-pressure compressor 30 is intended to supply with air one or more devices controlling the performance of the turbomachine 100, to ventilate the stages 61, 62 of the low-pressure turbine 60 and to purge the hot air from stages 51, 61, 62 of the high-pressure 50 and low-pressure 60 turbines.

Thus, in known fashion, at least one first cooling air circulation channel 200 collects air from the high-pressure compressor 30. The collected air can then be conveyed to at least one device controlling the performance of the turbomachine 100.

This device is, by way of an example, a device for controlling clearance between, on the one hand, the tips of the rotor blades 52, 64 of the high-pressure 50 or low-pressure 60 turbines and, on the other hand, the turbine annuli 54, 67 of the casing 66 surrounding these blades 52, 64. Thus, in the example illustrated, the first channel 200 conveys, in a nominal configuration, the air A collected from the high-pressure compressor 30 to a clearance J control device 300 of the high-pressure turbine 50. A device 300 of this type is currently known to a person skilled in the art through the designation HPTACC ("High Pressure Turbine Active Clearance Control").

In another example, not illustrated, the first channel 200, or another channel, can convey the air A collected to a clearance control device of the low-pressure turbine 60, i.e. to an LPTACC ("Low Pressure Turbine Active Clearance") device.

Still in known fashion, at least one second cooling air circulation channel 400 collects air from the high-pressure compressor 30 to purge the hot air from stages 51, 61, 62 of the high-pressure 50 and low-pressure 60 turbines, and cool the low-pressure turbine 60. One end 400*a* of each second channel 400 is connected as an air inlet to a cooling air collector 500. The outlet of the cooling air collector 500 is connected to the hollow nozzle 70 of the low-pressure turbine 60.

In conformity with the invention, the number of second channels 400 intended to convey the air connected at the high-pressure compressor 30 to the low-pressure turbine 60 is selected to respond only to the precise cooling needs of the turbine. In other words, the number of channels 400 is not over-dimensioned and corresponds to the minimum number of channels necessary for the ventilation of the disks 63 of the low-pressure turbine 60.

In the example illustrated in FIG. 1, a single channel 400 collects air intended for only the air cooling of the low-pressure turbine 60 under nominal conditions, i.e. in the absence of failure of this channel 400. A single air collecting channel A is therefore sufficient here to cool the low-pressure turbine 60 under nominal conditions. However, in other examples, not illustrated, the low-pressure turbine 60 can be cooled my means of a plurality of channels 400. The number of channels 400 is then selected so as to respond to the precise cooling needs of the low-pressure turbine 60, i.e. selected to convey the minimum air flow necessary to the cooling of the low-pressure turbine 60 and ensure uniform cooling over the entire circumference of the parts.

The first channel 200 is also equipped with a valve 600 allowing the connection of a third cooling air circulation channel 700. An air inlet of the third channel 700 is connected to the valve 600 and is in selective communication with the first channel 200 by means of it. One end 700*a*, corresponding to an air outlet of the third channel 700, is connected as an air inlet to the cooling air collector 500.

The valve 600 can be commanded according to two configurations from a control device 800. In a first configuration, corresponding to a default configuration of the valve 600, the valve 600 allows the circulation of collected air only in the first channel 200. In this first configuration, the air circulation through the third channel 700 is prohibited by the valve 600. In a second configuration, the valve 600 is commanded by the control device 800 so as to divert the air circulation originating in the first channel 200 to the third channel 700, allowing the air circulation in the latter.

The control device 800 commands the configuration of the valve 600 depending on a cooling air pressure determined for the low-pressure turbine 60. This cooling air pressure is determined by the control device 800 based on measurements originating in at least one data sensor C1, C2, C3.

In a first example, illustrated in FIG. 2, the data sensor C1 is a pressure sensor positioned in an enclosure 68 of the low-pressure turbine 60. This positioning of the sensor C1 allows measuring the pressure in the enclosure 68 at any time, and detecting a possible drop in pressure, which by way of an example could result from a failure of a labyrinth seal 69 providing pressure isolation of the enclosure 68, or breakage of an air circulation channel. Thus, if the control device 800 detects a drop in pressure in the enclosure 68, it can command the transition of the valve 600 from the first configuration to the second configuration. The air A collected from the high-pressure compressor 30 and circulating in the first channel 200 is then diverted to the third channel 700 by means of the valve 600. This second configuration then allows guaranteeing a flow of cooling air sufficient for cooling the low-pressure turbine 60, as well as for the hot air purging of stages 51, 61, 62 of the high pressure 50 and low pressure 60 turbines. The diverted air flow thus constitutes a complement to the cooling air conveyed by the second channel(s) 400 in the case of breakage of the labyrinth seal 69, or a flow of air replacing that of the second channel 400 in the event of breakage of the latter.

In a second example illustrated in FIG. 1, the data sensor C2 is a pressure sensor associated with the cooling air collector 500. The sensor C2 allows measuring the pressure in the collector 500 at any time, and allows the detection of a possible drop in pressure, translating a failure of the second channel 400. Thus, if the control device 800 detects a drop in pressure in the cooling air collector 500, it can command the transition of the valve 600 from the first configuration to the second configuration. The air collected from the high-pressure compressor 30 and circulating in the first channel 200 is diverted by the valve 600 so as to circulate in the third channel 700. This second configuration, via the diversion of the cooling air circulating in the first channel 200, then allows supplying a sufficient air flow for cooling the low-pressure turbine 60 and providing hot air purging to the stages 51, 61, 62 of the high pressure 50 and low pressure 60 turbines despite the failure of the second channel 400.

In a third example, when the turbomachine 100 has a plurality of second channels 400, the failure of a channel can be identified by the control device 800 based on a difference of pressure measured between the different channels 400. Each second channel 400 is then instrumented by a pressure sensor C3. Once again, when the control device 800 detects a pressure drop, corresponding to a failure of one of the channels 400, the device commands the transition of the valve 600 from the first configuration to the second configuration. Thus, the diversion by the valve 600 of the air circulating in the first channel 200 to the third channel 700 allows compensating the loss of cooling air due to the failure of one of the second channels 400.

Moreover, it is understood that the failure (example: breakage) of an air circulation channel can be detected by other means than pressure sensors, for example by detection of currents or of vibrations.

More generally, the cooling of the low-pressure turbine 60, as well as the purging of the stages 51, 61, 62 are performed as follows.

For a nominal operation of the turbomachine 100, for example in the absence of a failure of the labyrinth seal 69 or of a cooling air circulation channel 400, the valve 600 is initially in the first configuration. Air A circulating in the turbomachine 100 is collected from the high-pressure compressor 30. The collected air is then conveyed both by the first channel 200 to a turbomachine performance optimization device, for example to a clearance J control device 300 of the high-pressure turbine 50, and to the low-pressure turbine 60 by means of the second channel(s) 400 for the purpose of cooling it.

In parallel, the control device 800 determines the cooling air pressure of the low-pressure turbine 60 based on measurement of one or more data sensors C1, C2, C3, and compares the determined pressure to a threshold. This threshold, by way of an example, is predetermined based on a failure condition of a second channel 400 and/or failure of an isolation seal of the enclosure 68 of the low-pressure turbine 60.

When the cooling air pressure of the low-pressure turbine 60 is identified by the control device 800 as lower than said threshold, the control device 800 deduces a failure that risks impacting the proper cooling of the low-pressure turbine 60. The control device 800 then commands the valve 600 to transition from the first configuration to the second configuration. The cooling air of the first channel 200 is then diverted to the third channel 700 so as to distribute this cooling air to the low-pressure turbine 60.

Preferably, the first channel 200 is a channel distributing air to the clearance J control device 300 of the high-pressure turbine 50 when the turbomachine 100 is operating nominally, i.e. in the first configuration of the valve 600.

Still preferably, the control device 300 is an internal device in the turbine annulus 54 of the high-pressure turbine 50.

These preferred configurations have as their advantage to supply maximized cooling air flows circulating in the first channel 200. Thus, when the valve 600 is commanded into the second configuration, the cooling of the low-pressure turbine 60 as well as the hot air purging of the stages 51, 61, 62 of the high-pressure 50 and low-pressure 60 turbines are maximized. Other configurations are however practicable, for example the connection of the first channel 200 to the clearance control device of the low-pressure turbine 60, or even the use of a clearance control device external to the high-pressure turbine 50.

Moreover, as illustrated in FIG. 1, the diaphragms 201a, 401a can be positioned at the respective inlets of the first channel 200 and of the second channel(s) 400. Check valves 401b, 701b are then positioned at the respective outlets of the second channel(s) 400 and of the third channel 700. The diaphragms 201a, 401a and check valves 401b, 701b have as their function to minimize the effects on the collection of air from the high-pressure compressor 30 in the event of failure of one of the channels 200, 400, 700. The risks of cooling air losses are thus limited. Thus, in case of breakage of a channel, it is not necessary to detect the damaged channel, this being automatically isolated by its respective diaphragm and check valve.

Advantageously, the embodiments described above allow dispensing with any over-dimensioning for cooling the low-pressure turbine 60. While customarily cooling of the low-pressure turbine necessitates an additional air circulation channel to guarantee proper cooling of the turbine and to be compliant with aeronautical safety standards, the embodiments described above necessitate only the minimum number of channels required for cooling this turbine. In other words, here the low-pressure turbine 60 is cooled to its exact needs by the second channel(s) 400.

During nominal operation of the turbomachine 100, the air collected from the high-pressure compressor 30 can both be conveyed to the low-pressure turbine 60, for the purpose of its cooling to its exact need and, by way of an example, to the clearance control device 300 of the high-pressure turbine 50. The specific fuel consumption of the turbomachine 100 is therefore optimized under nominal operating conditions, these conditions corresponding to the first configuration of the valve 600.

If a failure occurs in the turbomachine 100, for example breakage of a second duct 200 or of a labyrinth seal 69, the cooling air initially dedicated, by way of an example, to the clearance control device 300 of the high-pressure turbine 50 is diverted to the low-pressure turbine 60 so as to guarantee its proper cooling. In this situation, corresponding to the second configuration of the valve 600, the overall performance of the turbomachine 100 is degraded to the benefit of the cooling of the low-pressure turbine 60. Nevertheless, such a reduction in the performance of the turbomachine 100 remains infrequent, because it is commanded only in the event of a failure detected in it. In contrast, the over-dimensioning of cooling circuits of the prior art involves over-collection of air from the high-pressure compressor during all nominal operation of the turbomachine. This over-collection then leads to a degradation of the overall performance of the turbomachine in the absence of any failure in it.

The embodiments proposed thus allow obtaining a high-performance emergency functionality for cooling the low-pressure turbine 60 and the purging of the stages 51, 61, 62 of the high pressure 50 and low pressure 60 turbines. This cooling functionality also responds perfectly to aeronautical safety requirements.

On the basis of these embodiments, it has been evaluated for all phases of operation of the turbomachine 100, that it is possible to obtain a gain in mass flow of fuel W25 at the inlet of the high-pressure compressor 30 on the order of 0.25% and a gain of 15% in specific fuel consumption.

The invention claimed is:

1. An aircraft turbomachine comprising:
   a high-pressure compressor,
   a high-pressure turbine,
   a low-pressure turbine,
   a first cooling air circulation channel putting into communication the high-pressure compressor and the high-pressure turbine, and
   a second cooling air circulation channel putting into communication the high-pressure compressor and the low-pressure turbine,
   wherein the first channel is equipped with a valve, and wherein the turbomachine also includes a third cooling air circulation channel in selective communication with the first channel by means of the valve, the third channel also being in communication with the low-pressure turbine, the valve having a first configuration in which air circulation in the first channel is allowed and air circulation in the third channel is prohibited, and a second configuration in which air circulation originating in the first channel is diverted to the third channel.

2. The turbomachine according to claim 1, also comprising a control device configured to determine a cooling air pressure of the low-pressure turbine and command the valve depending on the determined air pressure to cause the valve to transition from the first configuration to the second configuration.

3. The turbomachine according to claim 2, wherein one end of the second channel and one end of the third channel are connected to a cooling air collector, the cooling air collector also being connected to a hollow nozzle of the low-pressure turbine.

4. The turbomachine according to claim 2, comprising a plurality of second cooling air circulation channels, each putting into communication the high-pressure compressor and the low-pressure turbine.

5. The turbomachine according to claim 3, wherein the control device is configured to determine the cooling air pressure of the low-pressure turbine based on at least one measurement of a pressure sensor associated with the cooling air collector.

6. The turbomachine according to claim 3, wherein the control device is configured to determine the value of the cooling air pressure of the low-pressure turbine based on at least one measurement of a pressure sensor positioned in an enclosure of the low-pressure turbine.

7. The turbomachine according to claim 4, wherein the control device is configured to determine the cooling air pressure of the low-pressure turbine based on a difference of pressure measurements of pressure sensors associated with the plurality of second channels.

8. The turbomachine according to claim 2, also comprising a device for controlling a clearance between blade tips of a rotor of the high-pressure turbine and a turbine annulus of a casing surrounding the blades of the high-pressure turbine, one end of the first cooling air circulation channel being in communication with the clearance control device of the high-pressure turbine so as to supply the clearance control device with air when the valve is in the first configuration.

9. The turbomachine according to claim 8, wherein the clearance control device of the high-pressure turbine is an internal device in the turbine annulus.

10. A method for cooling a low-pressure turbine in an aircraft turbomachine produced according to claim 1, this method comprising:
 collecting air circulating in the high-pressure compressor,
 in an initial situation corresponding to the first configuration of the valve, distributing the air collected to the high-pressure turbine by means of the first channel and to the low-pressure turbine by means of the second channel,
 determining a cooling air pressure of the low-pressure turbine and comparing the value of the determined pressure to a threshold by the control device, and
 when the cooling air pressure of the low-pressure turbine is lower than the threshold, commanding the valve into the second configuration by the control device, so as to distribute the cooling air of the first channel to the low-pressure turbine.

11. The cooling method according to claim 10, wherein the threshold is predetermined based on a failure condition of the second channel.

12. The cooling method of claim 11, wherein the failure condition of the second channel includes breakage of the second channel.

\* \* \* \* \*